(12) United States Patent
Man

(10) Patent No.: US 9,709,247 B2
(45) Date of Patent: Jul. 18, 2017

(54) PORTABLE LIGHT WITH LIGHT DIRECTING MECHANISM FOR PROVIDING DIFFERENT LIGHT MODES

(71) Applicant: Kaper Industrial Limited, N.T. (HK)

(72) Inventor: Shiu-Fai Stephen Man, N.T. (HK)

(*) Notice: Subject to any disclaimer, the term of this patent is extended or adjusted under 35 U.S.C. 154(b) by 399 days.

(21) Appl. No.: 14/330,008

(22) Filed: Jul. 14, 2014

(65) Prior Publication Data

US 2016/0010831 A1 Jan. 14, 2016

(51) Int. Cl.

| | |
|---|---|
| *F21V 14/02* | (2006.01) |
| *F21V 8/00* | (2006.01) |
| *F21L 4/02* | (2006.01) |
| *F21L 4/00* | (2006.01) |
| *F21V 19/02* | (2006.01) |
| *F21V 7/00* | (2006.01) |
| *F21V 7/06* | (2006.01) |
| *F21Y 103/33* | (2016.01) |
| *F21Y 115/10* | (2016.01) |

(52) U.S. Cl.
CPC .............. *F21V 14/025* (2013.01); *F21L 4/00* (2013.01); *F21L 4/02* (2013.01); *F21V 19/02* (2013.01); *G02B 6/0096* (2013.01); *F21V 7/0016* (2013.01); *F21V 7/06* (2013.01); *F21Y 2103/33* (2016.08); *F21Y 2115/10* (2016.08)

(58) Field of Classification Search
CPC ...... F21V 14/025; F21V 14/06; F21V 14/065; F21V 14/08; F21V 14/085; F21V 14/02; F21V 14/04; F21V 14/045
USPC ........................................................... 362/35
See application file for complete search history.

(56) References Cited

U.S. PATENT DOCUMENTS

| | | | | |
|---|---|---|---|---|
| 5,426,417 A * | 6/1995 | Stanuch | ............... | B60Q 1/2611 340/471 |
| 5,806,956 A * | 9/1998 | Hyun-Jo | ................ | B60Q 1/245 362/272 |
| 6,877,876 B1 * | 4/2005 | Steinhilber | ........... | F21V 14/025 362/187 |
| 7,431,483 B1 * | 10/2008 | Lee | .......................... | F21V 14/02 362/286 |
| 7,537,360 B2 * | 5/2009 | Allegri | ..................... | F21S 10/02 362/2 |
| 7,677,759 B1 * | 3/2010 | Leung | ....................... | F21L 4/00 362/197 |
| 7,997,759 B2 * | 8/2011 | Feinbloom | .............. | F21V 14/06 362/235 |
| 8,529,076 B2 * | 9/2013 | Chang | ..................... | F21V 19/02 362/233 |
| 2008/0074279 A1 * | 3/2008 | Chiu | .................... | B60Q 1/2611 340/815.45 |

(Continued)

*Primary Examiner* — Ismael Negron
*Assistant Examiner* — Christopher E Dunay
(74) *Attorney, Agent, or Firm* — Prakash Nama; Global IP Services, PLLC

(57) ABSTRACT

A portable light with light directing mechanism for providing different light modes includes a light source, a housing, a first lighting member, a second lighting member, a rotating means and a light guide. The light guide together with the light source is rotatable by the rotating means along a light guide axis between a first position where the light passage member provides a light passage from the light source to the first light inlet of the first lighting member and a second position where the light passage member provides a light passage from the light source to the second light inlet of the second lighting member.

13 Claims, 5 Drawing Sheets

(56) References Cited

U.S. PATENT DOCUMENTS

| | | | |
|---|---|---|---|
| 2008/0080164 A1* | 4/2008 | Mastin | F21V 15/04 362/35 |
| 2008/0285259 A1* | 11/2008 | Uke | F21L 4/00 362/103 |
| 2009/0168425 A1* | 7/2009 | Chuang | F21S 10/02 362/284 |
| 2011/0255286 A1* | 10/2011 | Christ | F21L 4/08 362/249.02 |
| 2013/0208481 A1* | 8/2013 | Sooferian | F21V 14/02 362/280 |
| 2016/0265757 A1* | 9/2016 | Hsieh | F21V 14/02 |
| 2016/0313636 A1* | 10/2016 | Chien | G03B 29/00 |

* cited by examiner

PORTABLE LIGHT WITH LIGHT DIRECTING MECHANISM FOR PROVIDING DIFFERENT LIGHT MODES

BACKGROUND OF THE INVENTION

The present invention relates to a portable light and more particularly pertains to a portable light with light directing mechanism for providing different light modes.

There are various types of portable lights available in the marketplace, such as lanterns for providing omni-directional lighting effect, and flashlights for providing unidirectional lighting effect. There are occasions where it is desirable for a portable light to provide both omni-directional and unidirectional lighting effects according to a user's selection. Dual mode portable lights are therefore provided to cater for such needs. However, some of such dual mode portable lights are provided with separate light sources for each mode, with which the manufacturing costs are high.

BRIEF SUMMARY OF THE INVENTION

In view of the aforesaid disadvantages now present in the prior art, the object of the present invention is to provide a portable light with light directing mechanism for providing different light modes. The present invention requires only a single light source and provides a structure to rotate the light source to different orientations for providing different light modes.

To attain this, the present invention comprises a light source rotatably mounted within a housing, a first lighting member mounted within the housing for providing a first light mode and having a first light inlet, a second lighting member mounted within the housing for providing a second light mode and having a second light inlet, a rotating means, and a light guide comprising a light passage member; the light passage member is securely coupled with the light source in a way that light from the light source is only allowed to pass through the light passage member; the light guide together with the light source is rotatable by the rotating means along a light guide axis between a first position where the light passage member provides a light passage from the light source to the first light inlet of the first lighting member and a second position where the light passage member provides a light passage from the light source to the second light inlet of the second lighting member.

In one embodiment, the first lighting member is disposed along a vertical axis of the housing for providing omni-directional lantern light mode, and it comprises a first reflector having a first reflector input end serving as the first light inlet and a first reflector output end, and a concave lens circumjacent to the first reflector output end. Optionally, the concave lens may be a Fresnel lens. A reflective cover is optionally mounted to a bottom end of the housing, and the first lighting member may further comprise a first light diffuser having a top end securely mounted to the reflective cover and a bottom end circumjacent to the concave lens.

In one embodiment, the second lighting member is disposed along a horizontal axis of the housing for providing unidirectional flashlight light mode, and it comprises a second reflector having a second reflector input end serving as the second light inlet and a second reflector output end coupled to an opening at the housing.

In one embodiment, the light source comprises an LED module and a heat sink coupled to a bottom end of the LED module.

In one embodiment, the light passage member of the light guide is in parabolic shape with a smaller end, a larger end, an axis of symmetry and a reflective inner surface; the first reflector and the second reflector are both parabolic reflectors; at the first position; the larger end of the light passage member is circumjacent to the first light inlet position so that the light passage member and the first reflector form an integral parabolic reflector to collimate light from the light source and the collimated light is then diverged by the concave lens and then further reflected by the reflective cover and diffused by the first light diffuser to provide omni-directional light; at the second position, the larger end of the light passage member is circumjacent to the second light inlet position so that the light passage member and the second reflector form an integral parabolic reflector to collimate light from the light source to provide unidirectional light; the axis of symmetry is perpendicular to the light guide axis; the light guide axis is parallel to the horizontal axis of the housing.

In one embodiment, the light guide may further comprise a first light blocking member which is in circular disc shape positioned at a first lateral side of the light passage member and extended on a first vertical plane parallel to the axis of symmetry of the light passage member; the first light blocking member covers the second light inlet at the first position. The first light blocking member also serves as a shield to the opening at the housing so that users could only see the first light blocking member instead of the internal hardware from the opening at the housing in the first position. It also serves to prevent any light from the light source from passing through the second light inlet at the first position.

In one embodiment, the light guide may further comprises a second light blocking member in circular disc shape positioned on a second lateral side of the light passage member which is opposite to the first lateral side of the light passage member and extended on a second vertical plane parallel to axis of symmetry of the light passage member; the second light blocking member covers the first light inlet at the second position. The second light blocking member also serves to prevent any light from the light source from passing through the first light inlet at the second position.

In one embodiment, the housing may comprise an upper housing and a lower housing.

In one embodiment, the rotating means comprises a pinion with a pinion axis securely coupled with the light guide axis, a rack engaged with the pinion, and an annular ring rotatably coupled between a top end of the lower housing and a bottom end of the upper housing and securely coupled with the rack.

Alternatively, in another embodiment, the rotating means may comprise a cam with a cam axis securely coupled with the light guide axis, and a cover rotatably coupled between the top end of the lower housing and the bottom end of the upper housing; the cam is provided with an L-shaped guiding slot; the cover has a protrusion which is configured to slide along the L-shaped guiding slot as the cover is rotated.

In one embodiment, the housing may further comprise a top having a handle; the upper housing is transparent or translucent and has a top end securely coupled to the top; a middle housing is sleeved within a bottom end of the upper housing; the lower housing has a top end securely coupled to the bottom end of the upper housing; a base is securely coupled to a bottom end of the lower housing.

DETAILED DESCRIPTION OF THE INVENTION

Figure 1:
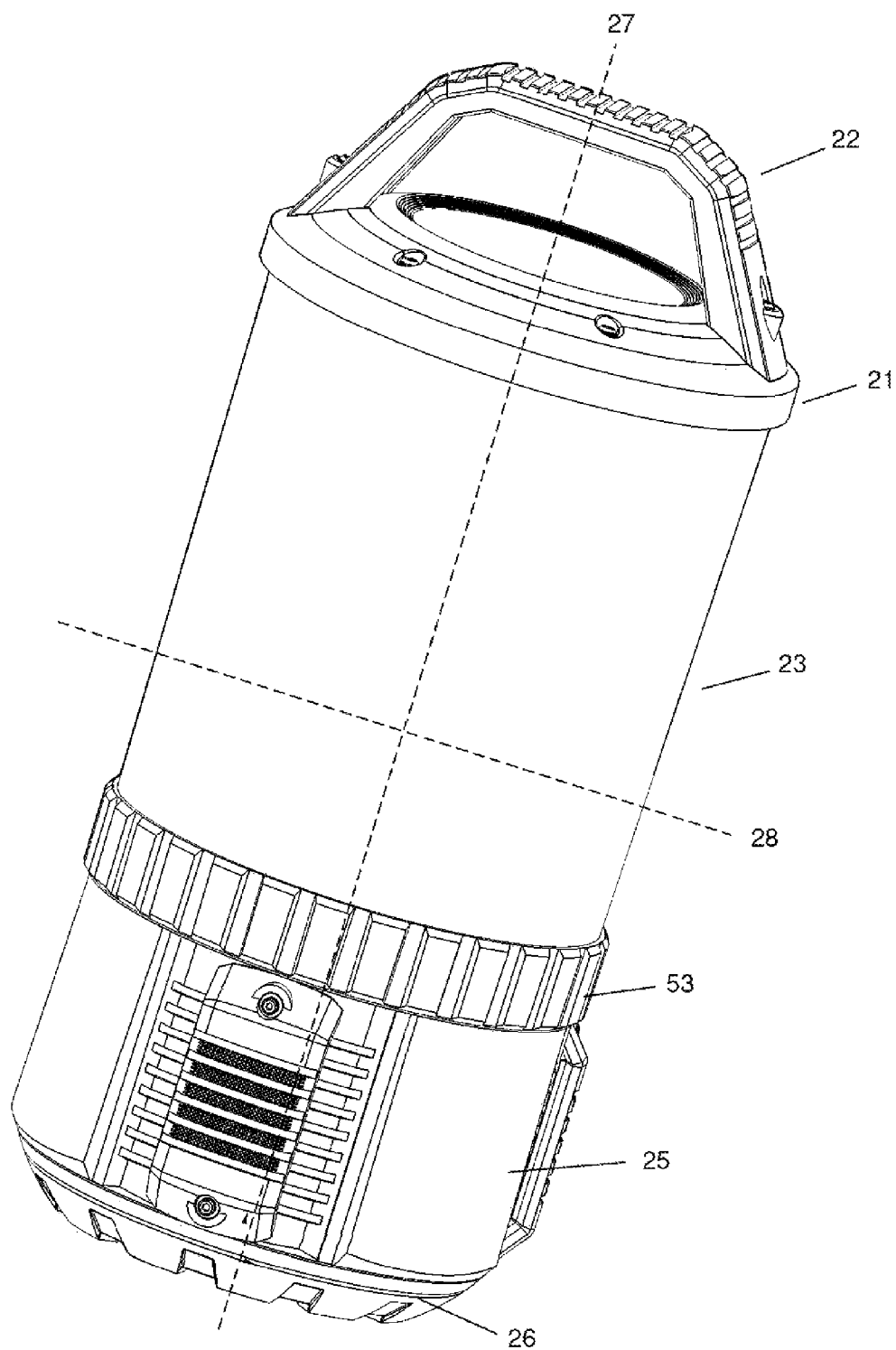
FIG. 1 is a perspective view illustrating the portable light of the first embodiment.
Figure 2:
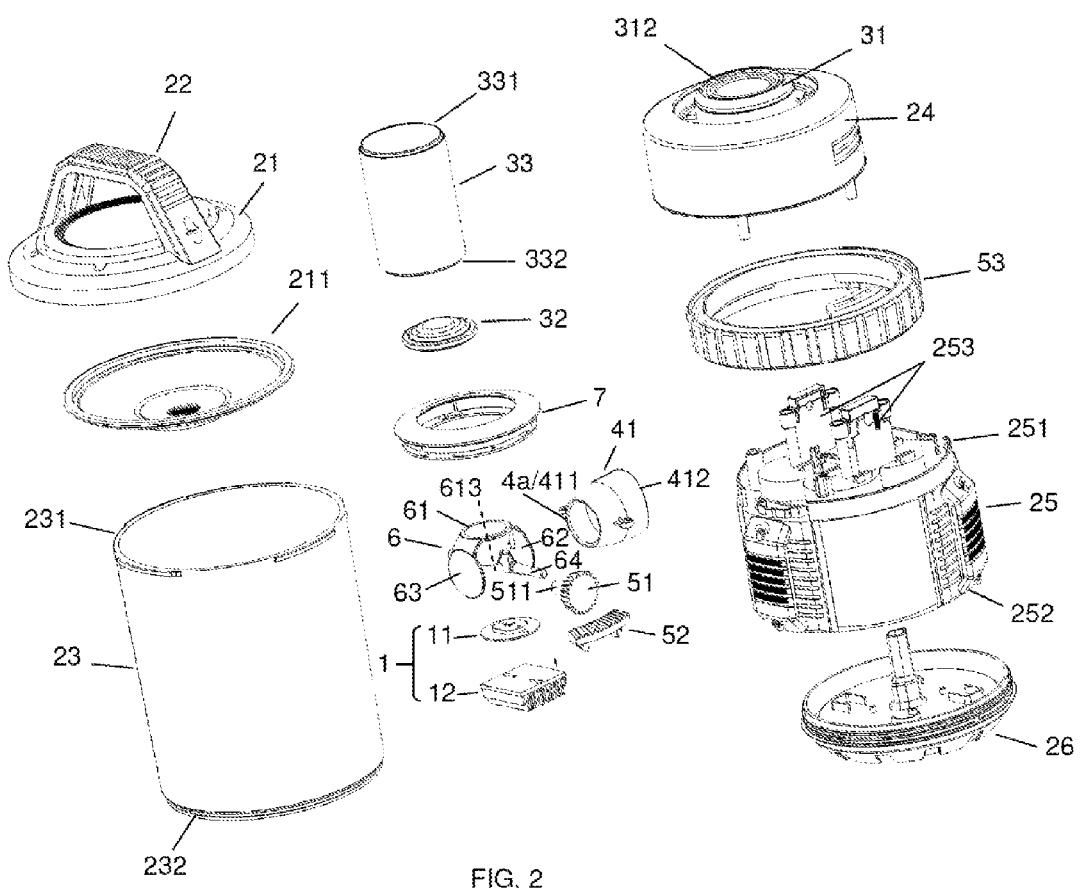
FIG. 2 is a perspective disassembling view of the first embodiment.
Figure 3:
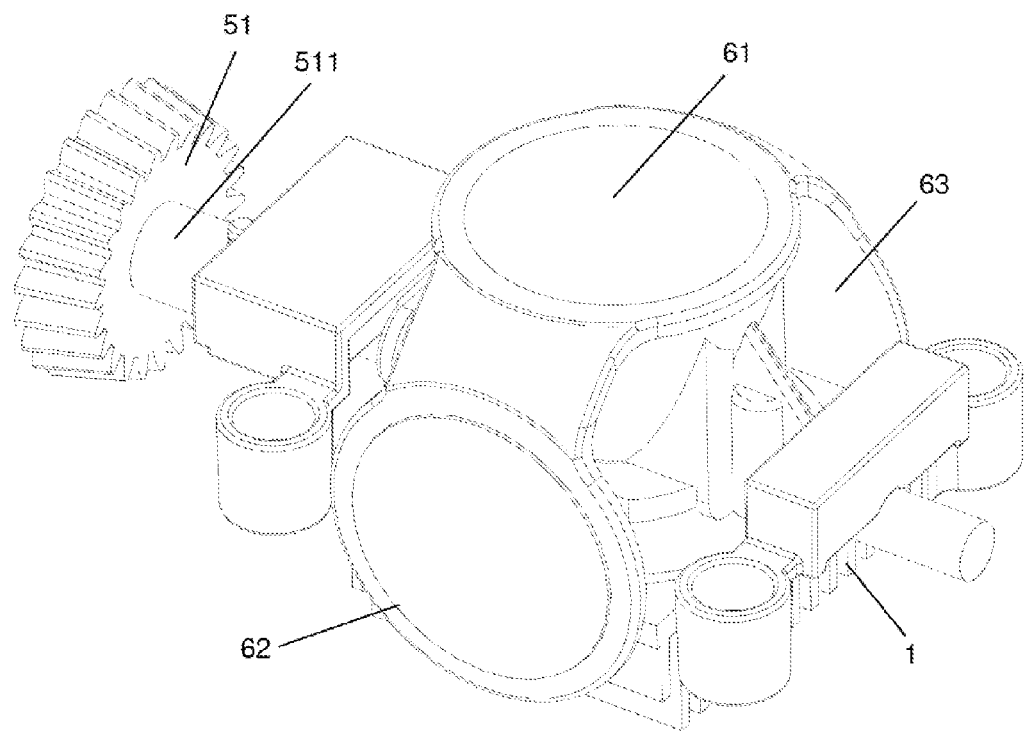
FIG. 3 is a perspective view illustrating the light source and the light guide at the first position.
Figure 4:
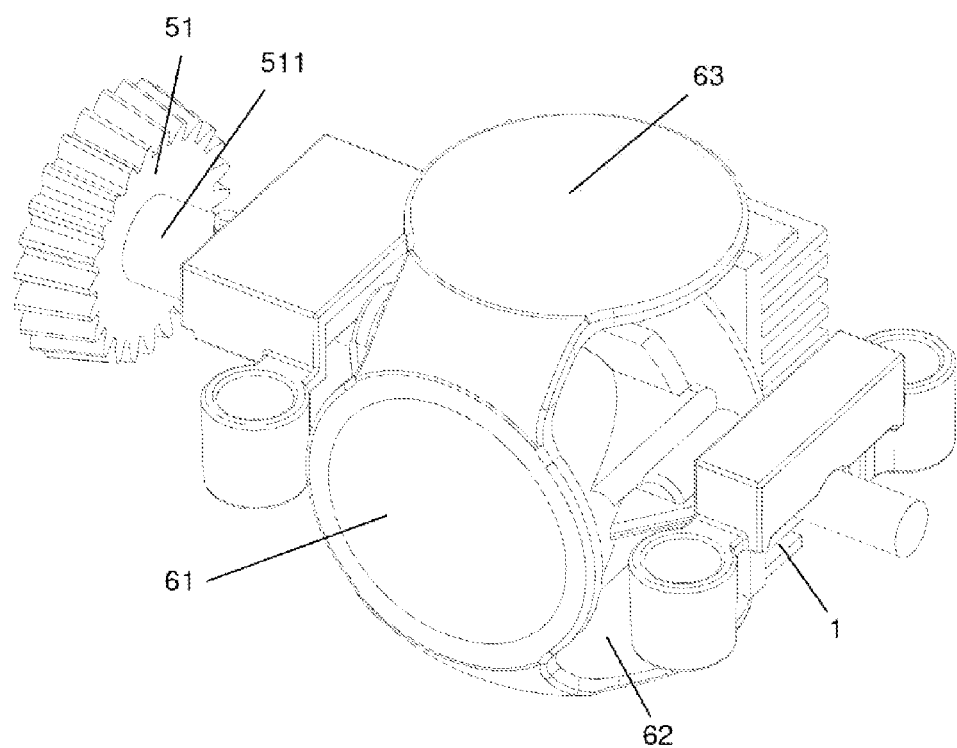
FIG. 4 is a perspective view illustrating the light source and the light guide at the second position.
Figure 5:
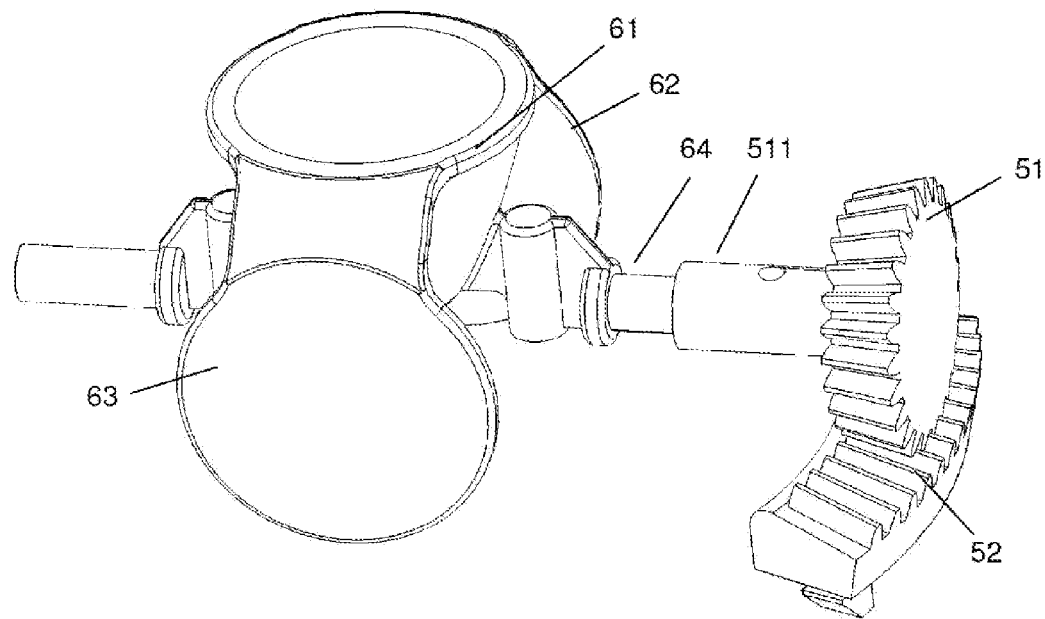
FIG. 5 is a perspective view illustrating the structure of the rack, the pinion and the light guide.
Figure 6:
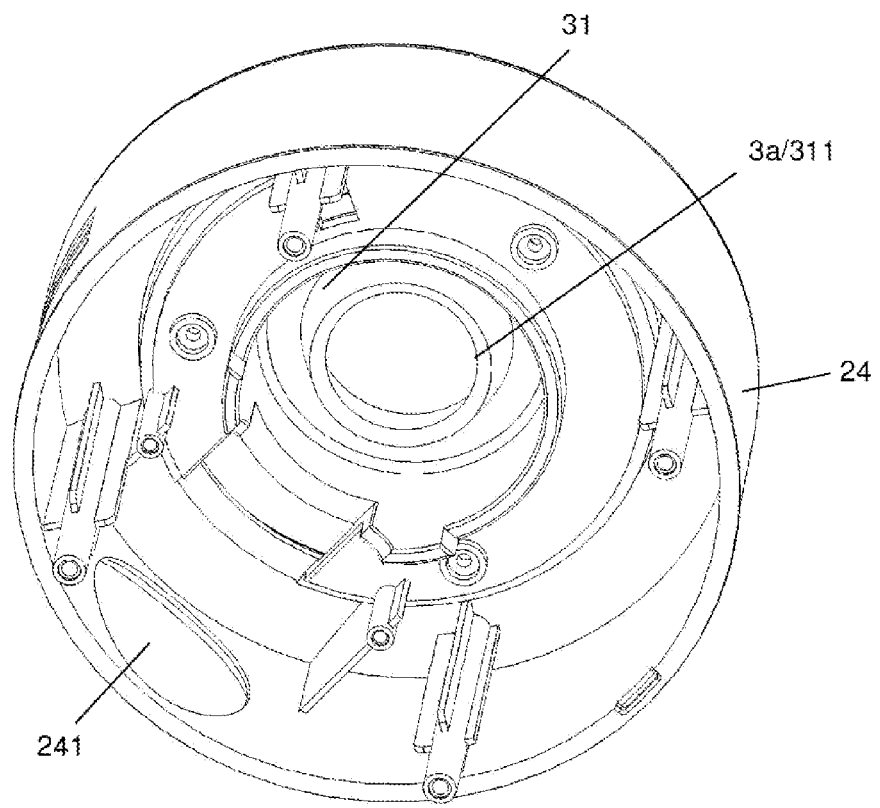
FIG. 6 is a perspective view of the middle housing and the first reflector.

The present invention is further described in detail with the following embodiment and the accompanying drawing.

As illustrated in FIGS. 1-6, the portable light of the present invention comprises a light source 1, a housing, a first lighting member, a second lighting member, a rotating means, a light guide 6, and an annular red LED module 7.

The housing comprises a top 21 having a handle 22, a transparent upper housing 23 having a top end 231 securely coupled to the top 21, a middle housing 24 sleeved within a bottom end 232 of the upper housing 23, a lower housing 25 having a top end 251 securely coupled to the bottom end 232 of the upper housing 23, and a base 26 securely coupled to a bottom end 252 of the lower housing 25. The lower housing 25 houses batteries and control circuits for providing power and controls to the light source 1. The configuration and arrangement of the batteries and the control circuits are widely available in the prior art and are therefore not detailed herein.

The light source 1 is rotatably mounted within the housing. In this embodiment, the light source 1 comprises an LED module 11 and a heat sink 12 coupled to a bottom end of the LED module 11.

The first lighting member is mounted within the housing for providing a first light mode and it has a first light inlet 3a. In this embodiment, the first lighting member is disposed along a vertical axis 27 of the housing for providing omnidirectional lantern light mode. The first lighting member comprises a first reflector 31, a concave lens 32 and a first light diffuser 33. The first reflector 31 has a first reflector input end 311 serving as the first light inlet 3a and a first reflector output end 312. In this embodiment, the first reflector 31 is a parabolic reflector. The concave lens 32 is circumjacent to the first reflector output end 312. In this embodiment, the concave lens 32 is a Fresnel lens. A reflective cover 211 is mounted to a bottom end of the top 21. The first light diffuser 33 has a top end 331 securely mounted to the reflective cover 211 and a bottom end 332 circumjacent to the concave lens 32.

The second lighting member is mounted within the housing for providing a second light mode and having a second light inlet 4a. In this embodiment, the second lighting member is disposed along a horizontal axis 28 of the housing for providing unidirectional flashlight light mode. The second lighting member comprises a second reflector 41 having a second reflector input end 411 serving as the second light inlet 4a, and a second reflector output end 412 coupled to an opening 241 at the middle housing 24. In this embodiment, the second reflector 41 is a parabolic reflector.

The light guide 6 comprises a light passage member 61, a first light blocking member 62, a second light blocking member 63, and a light guide axis 64. The light passage member 61 is securely coupled with the light source 1 in a way that light from the light source 1 is only allowed to pass through it. In this embodiment, the light passage member 61 is in parabolic shape with a smaller end 611, a larger end 612, an axis of symmetry 613 and a reflective inner surface 614. The axis of symmetry 613 is perpendicular to the light guide axis 64. The first light blocking member 62 is in circular disc shape and positioned at a first lateral side of the light passage member 61 and extended on a first vertical plane parallel to the axis of symmetry 613 of the light passage member 61. The second light blocking member 63 is in circular disc shape and positioned on a second lateral side of the light passage member 61 which is opposite to the first lateral side of the light passage member 61; the second light blocking member 63 extends on a second vertical plane parallel to axis of symmetry 613 of the light passage member 61. The light guide 6 together with the light source 1 is rotatable by the rotating means along the light guide axis 64 between a first position where the light passage member 61 provides a light passage from the light source 1 to the first light inlet 3a of the first lighting member and the first light blocking member 62 covers the second light inlet 4a of the second lighting member and a second position where the light passage member 61 provides a light passage from the light source 1 to the second light inlet 4a of the second lighting member and the second light blocking member 63 covers the first light inlet 3a of the first lighting member. More specifically, at the first position, the larger end 612 of the light passage member 61 is circumjacent to the first light inlet 3a (or the first reflector input end 311) so that the light passage member 61 and the first reflector 31 form an integral parabolic reflector to collimate light from the light source 1 and the collimated light is then diverged by the concave lens 32 and then further reflected by the reflective cover 211 and diffused by the first light diffuser 33 to provide omnidirectional light, and the first light blocking member 62 covers the second light inlet 4a (or the second reflector input end 411); at the second position, the larger end 612 of the light passage member 61 is circumjacent to the second light inlet 4a (or the second reflector input end 411) so that the light passage member 61 and the second reflector 41 form an integral parabolic reflector to collimate light from the light source 1 to provide unidirectional light, and the second light blocking member 63 covers the first light inlet 3a (or the first reflector input end 311).

The rotating means comprises a pinion 51 with a pinion axis 511 securely coupled with the light guide axis 64, a rack 52 engaged with the pinion 51, and an annular ring 53 rotatably coupled between the top end 251 of the lower housing 25 and the bottom end 232 of the upper housing 23 and securely coupled with the rack 52. In this embodiment, the pinion axis 511 and the light guide axis 64 are securely supported by two supporting stands 253 disposed at the lower housing 25.

As a user rotates the annular ring 53 laterally in a first direction from the first position to the second position, the rack 52 is driven to move laterally in the first direction; the lateral motion of the rack 52 translates to the rotational motion of the pinion 51 in a first pinion direction and thus drives the rotational motion of the light guide axis 64 in a first pinion direction; the light guide 6 together with the light source 1 is thereby driven to rotate from the first position to the second position in a first pinion direction for 90 degrees. When the light source 1 is switched on, light from the light source 1 only transmits to the second lighting member, thus allowing the portable light to serve as a flashlight. As the user rotates the annular ring 53 laterally in a second direction (which is opposite to the first direction) from the second position to the first position, the rack 52 is driven to move laterally in the second direction; the lateral motion of the rack 52 translates to the rotational motion of the pinion 51 in a second pinion direction (which is opposite to the first pinion direction) and thus drives the rotational motion of the light guide axis 64 in a second pinion direction; the light guide 6 together with the light source 1 is thereby driven to rotate from the second position to the first position in a second pinion direction for 90 degrees. When the light source 1 is switched on, light from the light source 1 only transmits to the first lighting member, thus allowing the portable light to serve as a lantern.

In this embodiment, the portable light further comprises an annular red LED module 7 securely disposed in the middle housing 24 and circumferencing the first reflector input end 311. The annular red LED module 7 allows the portable light to provide night light, but this feature may be omitted in other simple embodiments.

Figure 7:
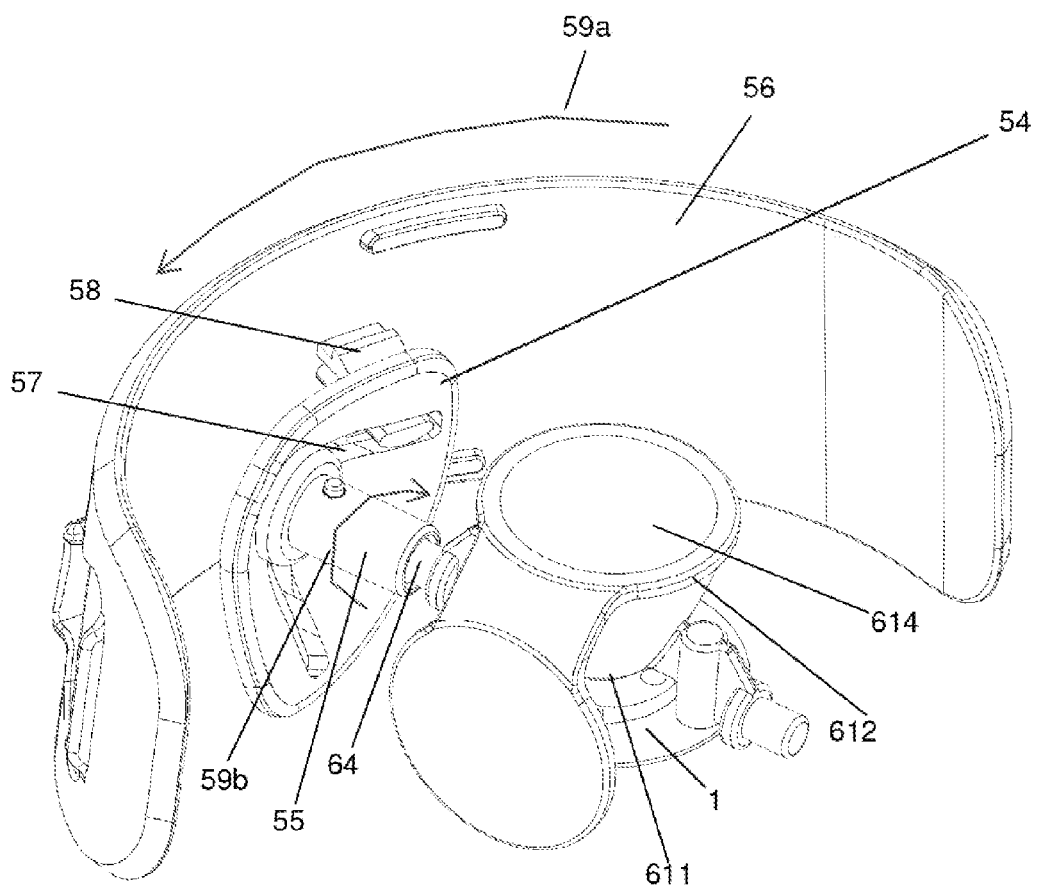
FIG. 7 is a perspective view of the rotating means of the second embodiment.

FIG. 7 illustrates the rotating means of the second embodiment. The second embodiment is basically the same as the first embodiment except for the rotating means. As shown in FIG. 7, the rotating means of the second embodiment comprises a cam 54 with a cam axis 55 securely coupled with the light guide axis 64, and a cover 56 rotatably coupled between the top end of the lower housing and the bottom end of the upper housing (not shown). The cam 54 is provided with an L-shaped guiding slot 57. The cover 56 has a protrusion 58 which is configured to slide along the L-shaped guiding slot 57 as the cover 56 is rotated. As a user rotates the cover 56 laterally in a first direction 59*a* from the first position to the second position, the protrusion 58 is driven to move from a first end of the L-shaped guiding slot 57 to a second end of the L-shaped guiding slot 57; the lateral motion of the protrusion 58 in turn drives the rotational motion of the cam axis 55 together with the light guide axis 64 in a first cam direction 59*b*; the light guide 6 together with the light source 1 is thereby driven to rotate from the first position to the second position in a first cam direction 59*b* for 90 degrees. When the light source 1 is switched on, light from the light source 1 only transmits to the second lighting member, thus allowing the portable light to serve as a flashlight. As the user rotates the cover 56 laterally in a second direction (which is opposite to the first direction 59*a*) from the second position to the first position, the protrusion 58 is driven to move from the second end of the L-shaped guiding slot 57 to the first end of the L-shaped guiding slot 57; the lateral motion of the protrusion 58 in turn drives the rotational motion of the cam axis 55 together with the light guide axis 64 in a second cam direction (which is opposite to the first cam direction 59*b*); the light guide 6 together with the light source 1 is thereby driven to rotate from the second position to the first position in the second cam direction for 90 degrees. When the light source 1 is switched on, light from the light source 1 only transmits to the first lighting member, thus allowing the portable light to serve as a lantern.

The above embodiments are preferred embodiments of the present invention. The present invention is capable of other embodiments and is not limited by the above embodiments. Any other variation, decoration, substitution, combination or simplification, whether in substance or in principle, not deviated from the spirit of the present invention, is replacement or substitution of equivalent effect and falls within the scope of protection of the present invention.

What is claimed is:

1. A portable light with light directing mechanism for providing different light modes which comprises:
   a housing
   a light source rotatably mounted within the housing;
   a first projection member mounted within the housing for providing a first light mode and having a first light inlet;
   a second projection member mounted within the housing for providing a second light mode and having a second light inlet;
   a rotating means; and
   a light guide comprising a light passage member;
   the light guide passage member is securely coupled with the light source in a way that light from the light source is only allowed to pass through the light passage member; the light guide together with the light source is rotatable by the rotating means along a light guide axis between a first position where the light passage member provides a light passage from the light source to the first light inlet of the first lighting member and a second position where the light passage member provides a light passage from the light source to the second light inlet of the second lighting member.

2. The portable light as in claim 1, wherein first lighting member is disposed along a vertical axis of the housing for providing omni-directional lantern light mode, and the second lighting member is disposed along a horizontal axis of the housing for providing unidirectional flashlight light mode.

3. The portable light as in claim 2, wherein the first lighting member comprises a first reflector having a first reflector input end serving as the first light inlet and a first reflector output end, and a concave lens circumjacent to the first reflector output end.

4. The portable light as in claim 3, wherein a reflective cover is mounted to a bottom end of the top of the housing.

5. The portable light as in claim 4, wherein the first lighting member further comprises a first light diffuser having a top end securely mounted to the reflective cover and a bottom end circumjacent to the concave lens.

6. The portable light as in claim 5, wherein the second lighting member comprises a second reflector having a second reflector input end serving as the second light inlet and a second reflector output end coupled to an opening at the housing.

7. The portable light as in claim 6, wherein the light source comprises an LED module and a heat sink coupled to a bottom end of the LED module.

8. The portable light as in claim 7, wherein the light passage member of the light guide is in parabolic shape with a smaller end, a larger end, an axis of symmetry and a reflective inner surface; the first reflector and the second reflector are both parabolic reflectors; at the first position, the larger end of the light passage member is circumjacent to the first light inlet so that the light passage member and the first reflector form an integral parabolic reflector to collimate light from the light source and the collimated light is then diverged by the concave lens and then further reflected by the reflective cover and diffused by the first light diffuser to provide omni-directional light; at the second position, the larger end of the light passage member is circumjacent to the second light inlet so that the light passage member and the second reflector form an integral parabolic reflector to collimate light from the light source to provide unidirectional light; the axis of symmetry is perpendicular to the light guide axis; the light guide axis is parallel to the horizontal axis of the housing.

9. The portable light as in claim 8, wherein the light guide further comprises a first light blocking member is in circular disc shape positioned at a first lateral side of the light passage member and extended on a first vertical plane parallel to the axis of symmetry of the light passage member; the first light blocking member covers the second light inlet at the first position.

10. The portable light as in claim 9, wherein the light guide further comprises a second light blocking member in circular disc shape positioned on a second lateral side of the light passage member which is opposite to the first lateral side of the light passage member and extended on a second vertical plane parallel to axis of symmetry of the light passage member; the second light blocking member covers the first light inlet at the second position.

11. The portable light as in claim 1, wherein the housing comprises an upper housing and a lower housing.

12. The portable light as in claim 11, wherein the rotating means comprises a pinion with a pinion axis securely coupled with the light guide axis, a rack engaged with the pinion, and an annular ring rotatably coupled between a top end of the lower housing and a bottom end of the upper housing, and securely coupled with the rack.

13. The portable light as in claim 11, wherein the housing further comprises a top having a handle; the upper housing is transparent or translucent and has a top end securely coupled to the top; a middle housing is sleeved within a bottom end of the upper housing; the lower housing has a top end securely coupled to the bottom end of the upper housing; a base is securely coupled to a bottom end of the lower housing.

* * * * *